(12) United States Patent
Weaver et al.

(10) Patent No.: US 8,531,128 B2
(45) Date of Patent: *Sep. 10, 2013

(54) ELECTRICAL CIRCUIT FOR DRIVING LEDS IN DISSIMILAR COLOR STRING LENGTHS

(75) Inventors: Matthew D. Weaver, Aptos, CA (US); Herman Ferrier, Scotts Valley, CA (US)

(73) Assignee: Lumenetix, Inc., Scotts Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/162,501

(22) Filed: Jun. 16, 2011

(65) Prior Publication Data

US 2011/0309757 A1 Dec. 22, 2011

Related U.S. Application Data

(63) Continuation of application No. 12/370,545, filed on Feb. 12, 2009, now Pat. No. 7,986,107.

(60) Provisional application No. 61/112,074, filed on Nov. 6, 2008.

(51) Int. Cl.
*H05B 37/02* (2006.01)

(52) U.S. Cl.
USPC ........... 315/291; 315/294; 315/121; 315/295; 315/185 R

(58) Field of Classification Search
USPC ............. 315/291, 294, 295, 307, 185 R, 192, 315/193, 169.3; 345/76–78, 82, 83, 102
See application file for complete search history.

(56) References Cited

U.S. PATENT DOCUMENTS 6,153,980 A * 11/2000 Marshall et al. ............... 315/294
7,317,403 B2 * 1/2008 Grootes et al. ................ 345/102

(Continued)

FOREIGN PATENT DOCUMENTS

| JP | 2001051638 A | 2/2001 |
|----|--------------|--------|
| JP | 2004235046 A | 8/2004 |

(Continued)

OTHER PUBLICATIONS

International Search Report PCT/US2009/001254 dated May 28, 2009 pp. 1-3.

(Continued)

*Primary Examiner* — Tung X Le
(74) *Attorney, Agent, or Firm* — Perkins Coie LLP

(57) ABSTRACT

An electrical circuit is disclosed. The electrical circuit comprises a plurality of color strings coupled in series, where each color string has at least one lamp, preferably a light emitting diode. The color strings may be of dissimilar length and may contain light emitting diodes of different colors. In one embodiment, a switch coupled in parallel with one of the color strings is configured to shunt power away from the color string to a power supply. In another embodiment, a switch coupled in parallel with one of the color strings is configured to shunt power away from the color string to one or more other color strings. In several embodiments, passive storage elements are utilized to store shunted power. In another embodiment, a current injector is configured to inject or remove current from a node adjacent to a color string. In several embodiments the invention is implemented as a light emitting diode driver integrated circuit or chip. Methods are disclosed for producing a desired light output utilizing color strings that may be of dissimilar length and that may contain light emitting diodes of different colors.

20 Claims, 14 Drawing Sheets

(56) References Cited

U.S. PATENT DOCUMENTS

| | | | |
|---|---|---|---|
| 7,425,943 B2* | 9/2008 | Furukawa | 345/102 |
| 7,468,723 B1* | 12/2008 | Collins | 345/102 |
| 7,649,326 B2* | 1/2010 | Johnson et al. | 315/291 |
| 7,663,598 B2* | 2/2010 | Kim | 345/102 |
| 7,688,002 B2* | 3/2010 | Ashdown et al. | 315/291 |
| 7,986,107 B2 | 7/2011 | Weaver et al. | |
| 2007/0257623 A1 | 11/2007 | Johnson et al. | |
| 2008/0122376 A1* | 5/2008 | Lys | 315/192 |
| 2008/0191642 A1* | 8/2008 | Slot et al. | 315/295 |
| 2008/0303452 A1* | 12/2008 | Van Erp | 315/294 |
| 2010/0194274 A1* | 8/2010 | Hoogzaad | 315/51 |

FOREIGN PATENT DOCUMENTS

| | | |
|---|---|---|
| JP | 2005310997 A | 11/2005 |
| WO | WO-2006/107199 | 10/2006 |
| WO | WO2008/139365 * | 11/2008 |
| WO | WO-2008/139365 A1 | 11/2008 |

OTHER PUBLICATIONS

Written Opinion PCT/US2009/001254 dated May 28, 2009 pp. 1-3.
Non-Final Office Action mailed Dec. 8, 2010, in Co-Pending U.S. Appl. No. 12/370,545 of Weaver, et al., filed Feb. 12, 2009.

* cited by examiner

ELECTRICAL CIRCUIT FOR DRIVING LEDS IN DISSIMILAR COLOR STRING LENGTHS

CLAIM OF PRIORITY

This application is a continuation application of U.S. patent application Ser. No. 12/370,545, entitled ELECTRICAL CIRCUIT FOR DRIVING LEDS IN DISSIMILAR COLOR STRING LENGTHS, filed Feb. 12, 2009 now U.S. Pat. No. 7,986,107, which claims priority to U.S. Provisional Patent Application No. 61/112,074 entitled "AN ELECTRICAL CIRCUIT FOR DRIVING LIGHT EMITTING DIODES IN DISSIMILAR COLOR STRING LENGTHS", filed on Nov. 6, 2008 by Matthew Weaver, both of which are expressly incorporated herein by reference.

BACKGROUND

A light-emitting diode (LED) is a semiconductor diode that emits incoherent narrow-spectrum light when electrically biased in the forward direction of the p-n junction. LEDs typically produce more light per watt than incandescent bulbs. LEDs are often used in battery powered or energy saving devices, and are becoming increasingly popular in higher power applications such as, for example, flashlights, area lighting, and regular household light sources.

A primary consideration with the use of LEDs in higher-power applications is the quality of delivered light. High brightness white LEDs tend to have high spectral peaks at certain wavelengths. The Color Rendering Index (CRI) is a measure of how true the light is as compared to an ideal or natural light source in representing the entire light spectrum. An ideal or natural light source has a high CRI of, for example, 100. White LEDs typically have a poor CRI, in the approximate range of 70-80, because of their spectral concentration. To solve this problem with white LEDs, a preferred approach has been to mix the light from different-colored LEDs to better fill out the light spectrum. For example, combinations of white, amber, red, and green can provide CRIs at or above 90. These combinations can also provide for color temperature control without adding efficiency-eroding phosphors to LEDs.

Combinations of different-colored LEDs may include color strings of same-colored LEDs. There are two conventional approaches for modulating the light output from each string of same-colored LEDs. The first approach is to directly modulate the current source to each string, which in turn varies the amplitude of each string's output. The second approach is to provide a constant current source and turn the string of LEDs on and off over a particular duty cycle to change the perceived light intensity of that string. These approaches are used not only to change the relative intensity of each color but also to raise and lower the overall intensity of the string in a manner similar to a dimming function. While these approaches provide complete color control, they both have significant efficiency penalties.

With the current-modulating first approach, LEDs are regulated, for example with a Buck regulator, from a common bus voltage source that meters a regulated current to each string. The bus voltage is sized to the longest string by adding up the voltage drop across each LED. Consequently, the shorter strings are penalized by having to regulate the current with a disproportionately greater voltage drop. With multiple different-color LED strings being utilized in the first approach to provide a high CRI value, the overall efficiency penalty can be high. For example, in an application having a string of 5 white LEDs, a string with one green LED, and a string with one red LED, the voltage drop across the white LEDs will add up to approximately 15 volts, but the red and green LED strings will be regulated to 3 volts. Regulating a 15 Volt string from a 15V bus would be very efficient, but regulating the other strings to 3 volts would be quite inefficient. This situation becomes worse when considering that the mains (AC input) needs to be regulated from 120 VAC or 270 VAC down to the bus voltage. Typically, the bus would be sized to about 30 VDC to allow for reasonable efficiency converting from the mains to the DC bus, making even the longest string less efficient.

The duty-cycling second approach uses a constant current source for each LED string and modulates ("blink") the duty cycle of the LED string itself at a rate imperceptible to the human eye. This allows for a simple current regulator, such as an LM317, but it must still regulate down to match the lower LED string requirements, which is inefficient. Furthermore, running the LEDs at their full current rating and duty cycling their outputs is far less efficient than simply running the LEDs continuously at a lower current, because LED efficiency declines with increasing current output.

The foregoing examples of the related art and limitations related therewith are intended to be illustrative and not exclusive. Other limitations of the related art will become apparent upon a reading of the specification and a study of the drawings.

SUMMARY

An electrical circuit is disclosed. The electrical circuit comprises a plurality of color strings coupled in series, where each color string has at least one lamp, preferably a light emitting diode. The color strings may be of dissimilar length and may contain light emitting diodes of different colors. In one embodiment, a switch coupled in parallel with one of the color strings is configured to shunt power away from the color string to a power supply. In another embodiment, a switch coupled in parallel with one of the color strings is configured to shunt power away from the color string to one or more other color strings. In several embodiments, passive storage elements are utilized to store shunted power. In another embodiment, a current injector is configured to inject or remove current from a node adjacent to a color string. In several embodiments the invention is implemented as a light emitting diode driver integrated circuit or chip. Methods are disclosed for producing a desired light output utilizing color strings that may be of dissimilar length and that may contain light emitting diodes of different colors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Described in detail below is an electrical circuit for driving light emitting diodes (LEDs) in dissimilar color string lengths.

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description. Although the diagrams depict components as functionally separate, such depiction is merely for illustrative purposes. It will be apparent to those skilled in the art that the components portrayed in this figure may be arbitrarily combined or divided into separate components.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Figure 1:
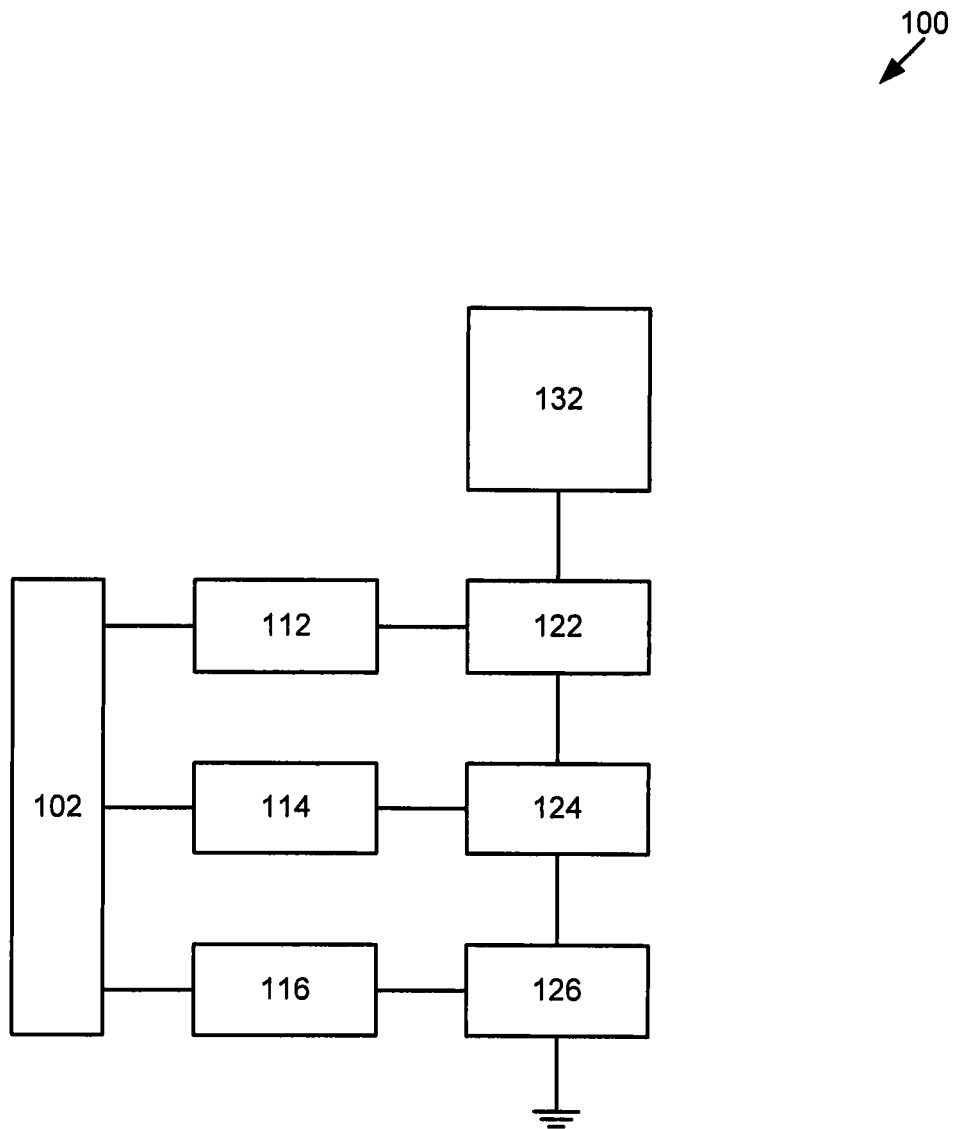
FIG. 1 depicts a block diagram of an electrical circuit for driving LEDs in dissimilar color string lengths.

FIG. 1 depicts a block diagram of electrical circuit 100 for driving LEDs in dissimilar color string lengths according to one embodiment of the invention. In the example of FIG. 1, electrical circuit 100 includes power supply 132 coupled to color string 122, color string 124, and color string 126 (collectively "color strings 122 through 126"), which are coupled in series in that order. Electrical circuit 100 also includes controller 102 coupled to bypass switch 112, bypass switch 114, and bypass switch 116 (collectively "bypass switches 112 through 116"). Although FIG. 1 depicts three color strings in color strings 122 through 126, other embodiments of the invention may have fewer or more color strings. Similarly, although FIG. 1 depicts three bypass switches in bypass switches 112 through 116, other embodiments of the invention may have fewer or more bypass switches.

As shown in FIG. 1, bypass switch 112 is coupled to color string 122, bypass switch 114 is coupled to color string 124, and bypass switch 116 is coupled to color string 126. In some embodiments, bypass switches 112 through 116 are coupled to color strings 122 through 126 via additional components not shown in FIG. 1.

In one embodiment, power supply 132 is a high frequency current regulator configured as a constant current source for color strings 122 through 126. Thus, during operation, power supply 132 provides power to color strings 122 through 126. In one embodiment, controller 102 is a processor configured with software for controlling bypass switches 112 through 116. In other embodiments, controller 102 may be a digital control circuit, an analog control circuit, or any circuit suitable for controlling bypass switches 112 through 116. During operation of an embodiment in which controller 102 is a processor, controller 102 executes software to provide control signals to bypass switches 112 through 116, which are thus controlled to route power provided by power supply 132 among color strings 122 through 126 according to the invention, as described further below.

Color strings 122 through 126 each have at least one lamp, preferably implemented as an LED. In other embodiments of the invention, the at least one lamp is implemented as a different source of light or radiation. In some embodiments, one or more of color strings 122 through 126 may have a plurality of LEDs. Thus, color strings 122 through 126 may have a dissimilar number of LEDs, such that one or more of color strings 122 through 126 may have a dissimilar color string length. In various embodiments, the LEDs of each of color strings 122 through 126 may be placed in various physical orientations. Additionally, in some embodiments the LEDs of a plurality of color strings 122 through 126 may share a similar physical orientation. Furthermore, the LEDs of each of color strings 122 through 126 may be configured to emit light in various colors.

In some embodiments, the LEDs of each of color strings 122 through 126 are electrically coupled in series. In such embodiments, given that color strings 122 through 126 themselves are coupled in series as shown in FIG. 1 and described above, the LEDs of all of color strings 122 through 126 are coupled in series. Thus, in such embodiments, the LEDs of all of color strings 122 through 126 present a high voltage drop that is the sum of their individual voltage drops. Power supply 132, providing power to color strings 122 through 126 as described above, may thus provide a similarly high supply voltage. In doing so, power supply 132 therefore exhibits higher mains-to-supply voltage conversion efficiency.

Figure 2:
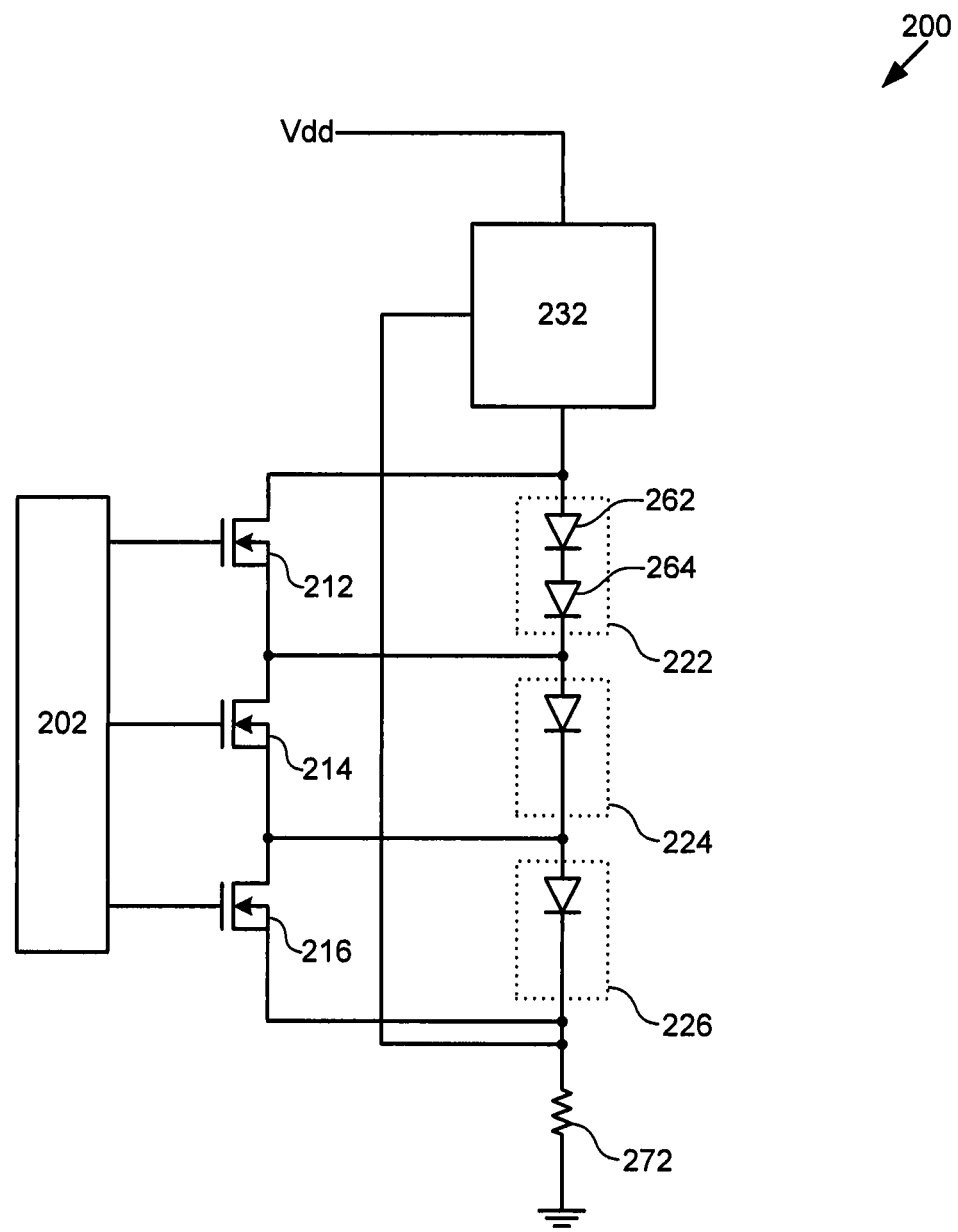
FIG. 2 depicts an electrical circuit for driving LEDs in dissimilar color string lengths.

FIG. 2 depicts electrical circuit 200 for driving LEDs in dissimilar color string lengths according to one embodiment of the invention. In the example of FIG. 2, electrical circuit 200 includes power supply 232 coupled to color string 222, color string 224, and color string 226 (collectively "color strings 222 through 226"), which are coupled in series in that order. Electrical circuit 200 also includes controller 202 coupled to bypass switch 212, bypass switch 214, and bypass switch 216 (collectively "bypass switches 212 through 216"). Although FIG. 2 depicts three color strings in color strings 222 through 226, other embodiments of the invention may have fewer or more color strings. Similarly, although FIG. 2 depicts three bypass switches in bypass switches 212 through 216, other embodiments of the invention may have fewer or more bypass switches. A portion of electrical circuit 200 including, for example, bypass switches 212 through 216 comprises a driver for driving a plurality of color strings each having at least one light emitting diode, where the driver may be implemented, for example, as an integrated circuit or a chip.

As shown in FIG. 2, bypass switch 212 is coupled in parallel with color string 222, bypass switch 214 is coupled in parallel with color string 224, and bypass switch 216 is coupled in parallel with color string 226. As further shown in FIG. 2, bypass switches 212 through 216 are each implemented as a transistor (e.g., a FET). In various embodiments, however, bypass switches 212 through 216 are implemented as alternative switching devices capable of partially or fully shunting power around color strings 222 through 226. FIG. 2 shows exemplary detail of color strings 222 through 226. For example, color string 222 is shown as having LED 262 and LED 264. Color string 224 and color string 226 are also shown to each have an LED.

In one embodiment, power supply 232 is a high frequency current regulator configured as a constant current source for color strings 222 through 226, and also configured to receive feedback from current sense resistor 272. Based on the feedback and on an input from a main voltage source (not shown), during operation power supply 232 provides power to color strings 222 through 226. In one embodiment, controller 202 is a processor configured with software for controlling bypass switches 212 through 216. During operation, controller 202 executes software to provide control signals to bypass switches 212 through 216, which are thus controlled to route power provided by power supply 232 among color strings 222 through 226.

For example, during operation of electrical circuit 200, controller 202 executes software to provide a control signal to bypass switch 212. In particular, in one embodiment controller 202 modulates a signal on the gate of bypass switch 212, which operates to shunt power around LED 262 and LED 264. Similarly controlled bypass switch 214 and bypass switch 216 shunt power around the LEDs of color string 224 and color string 226. The apparent brightness of color string 222 may be controlled by modulating the signal on the gate of bypass switch 212 at a 50% duty cycle, for example, at a frequency between 200 and 1000 hertz inclusive, for example. By controlling the apparent brightness of a color string in this manner, without using dissipative circuit elements, electrical circuit 200 achieves high electrical efficiency. In one embodiment, controller 202 modulates the signals on the gates of all of bypass switches 212 through 216 in this manner, at coordinated duty cycles and frequencies, to advantageously control the apparent brightness of color strings 222 through 226. During such operation, power supply 232 is in one embodiment configured to continue providing a stable current while varying amounts of power are shunted around color strings 222 through 226.

In one embodiment, power supply 232 is configured to provide a current determined for color string 222 (e.g., a current for producing a desired brightness of color string 222), while varying amounts of power are shunted around one or both of color string 224 and color string 226. Thus configured, little or no power is shunted through bypass switch 212, and varying amounts of power are shunted through bypass switch 214 and bypass switch 216 to produce a desired total brightness of color strings 222 through 226. Such an embodiment achieves higher efficiency than, for example, configuring power supply 232 to provide a greater current and then shunting varying amounts of power around all three of color strings 222 through 226. A similar high efficiency can also be achieved by determining a current for color string 224 and shunting power around one or both of color string 222 and color string 226, or by determining a current for color string 226 and shunting power around one or both of color string 222 and color string 224. Further, a similar high efficiency can also be achieved by determining a current for one particular color string in embodiments having fewer or more color strings than depicted in electrical circuit 200.

As shown in FIG. 2, color strings 222 through 226 each have at least one LED. In various embodiments, the LEDs of each of color strings 222 through 226 may be placed in various physical orientations. Additionally, in some embodiments the LEDs of a plurality of color strings 222 through 226 may share a similar physical orientation. Furthermore, the LEDs of each of color strings 222 through 226 may be configured to emit light in various colors.

As also shown in FIG. 2, the LEDs of all of color strings 222 through 226 are electrically coupled in series. As such, the LEDs of all of color strings 222 through 226 present a high voltage drop that is the sum of their individual voltage drops. Power supply 232, providing power to color strings 222 through 226 as described above, may thus provide a similarly high supply voltage. In doing so, power supply 232 therefore exhibits higher mains-to-supply voltage conversion efficiency.

Figure 3:
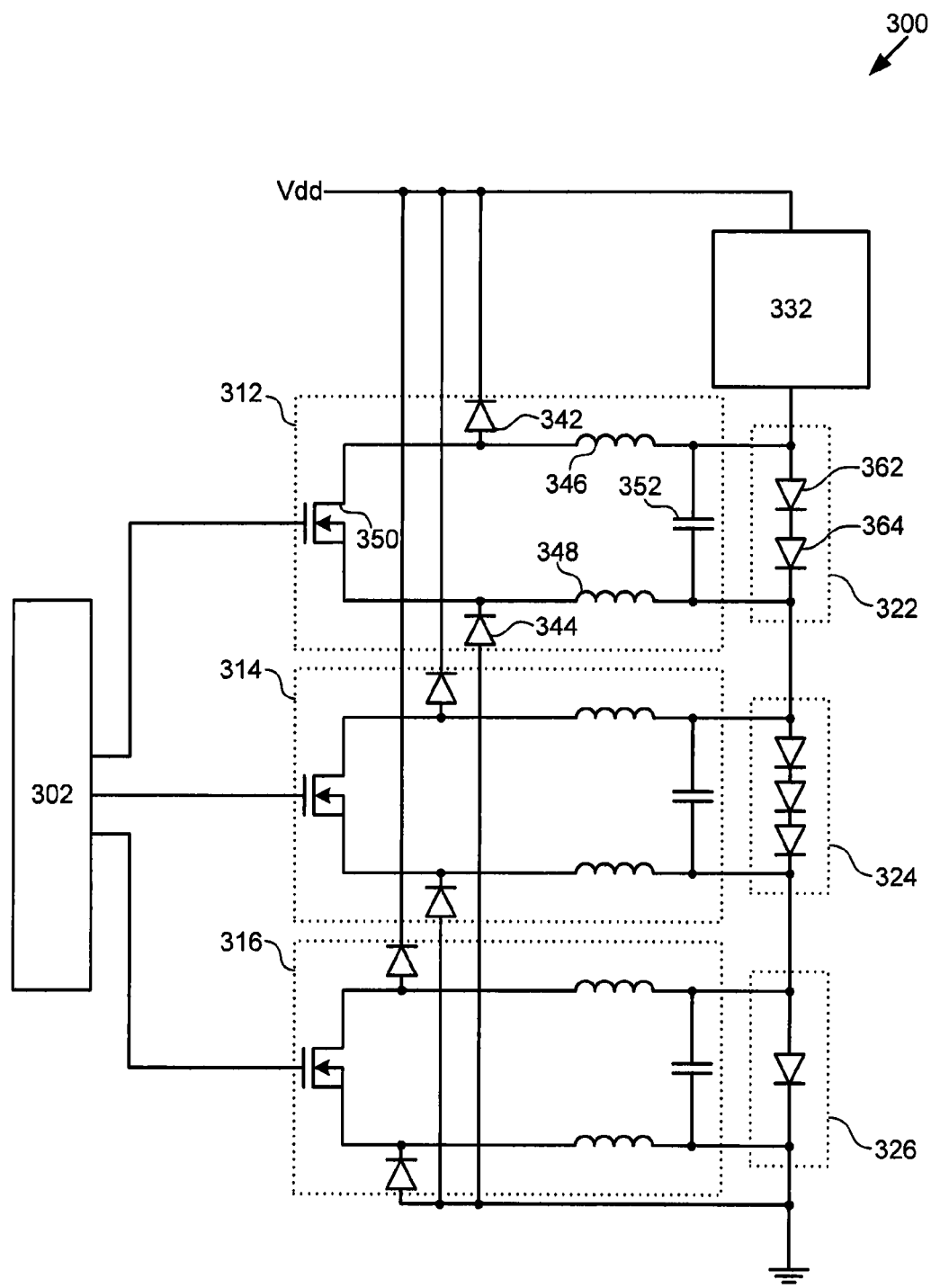
FIG. 3 depicts an electrical circuit for driving LEDs in dissimilar color string lengths.

FIG. 3 depicts electrical circuit 300 for driving LEDs in dissimilar color string lengths according to one embodiment of the invention. In the example of FIG. 3, electrical circuit 300 includes power supply 332 coupled to color string 322, color string 324, and color string 326 (collectively "color strings 322 through 326"), which are coupled in series in that order. Electrical circuit 300 also includes controller 302 coupled to bypass switch 312, bypass switch 314, and bypass switch 316 (collectively "bypass switches 312 through 316"). Although FIG. 3 depicts three color strings in color strings 322 through 326, other embodiments of the invention may have fewer or more color strings. Similarly, although FIG. 3 depicts three bypass switches in bypass switches 312 through 316, other embodiments of the invention may have fewer or more bypass switches. A portion of electrical circuit 300 including, for example, bypass switches 312 through 316 comprises a driver for driving a plurality of color strings each having at least one light emitting diode, where the driver may be implemented, for example, as an integrated circuit or a chip. Some embodiments of such a driver may exclude portions of switches 312 through 316 such as, for example, inductors or capacitors. Such a driver may include, in one embodiment, either or both of controller 302 and power supply 332.

As shown in FIG. 3, bypass switch 312 is coupled to color string 322, bypass switch 314 is coupled to color string 324, and bypass switch 316 is coupled to color string 326. FIG. 3 shows exemplary detail of bypass switches 312 through 316 that is not shown in corresponding bypass switches 112 through 116 of FIG. 1. For example, bypass switch 312 is shown as having transistor 350, diode 342, diode 344, inductor 346, inductor 348, and capacitor 352. Bypass switch 312 is thus coupled to color string 322 across a passive storage element (e.g., inductor 346, inductor 348, or capacitor 352). By including such a passive storage element, current in color string 322, for example, can be kept substantially continuous with very little ripple. Further, the current in color string 322, for example, being substantially continuous, may be lower for a given apparent brightness of color string 322 than the current in a circuit omitting such a passive storage element. In a particular example, a circuit omitting such a passive storage element that applies power at a 50% duty cycle to a color string will exhibit a given peak current in the color string, but if electrical circuit 300 applies power at a 50% duty cycle to color string 322, color string 322 will advantageously exhibit a continuous current of half, or less than half, of the given peak current, thereby enabling higher LED efficiency. Bypass switch 314 and bypass switch 316 are shown to have corresponding circuit elements. FIG. 3 also shows exemplary detail of color strings 322 through 326. For example, color string 322 is shown as having LED 362 and LED 364. Color string 324 and color string 326 are also shown to have one or more LEDs.

Figure 8:
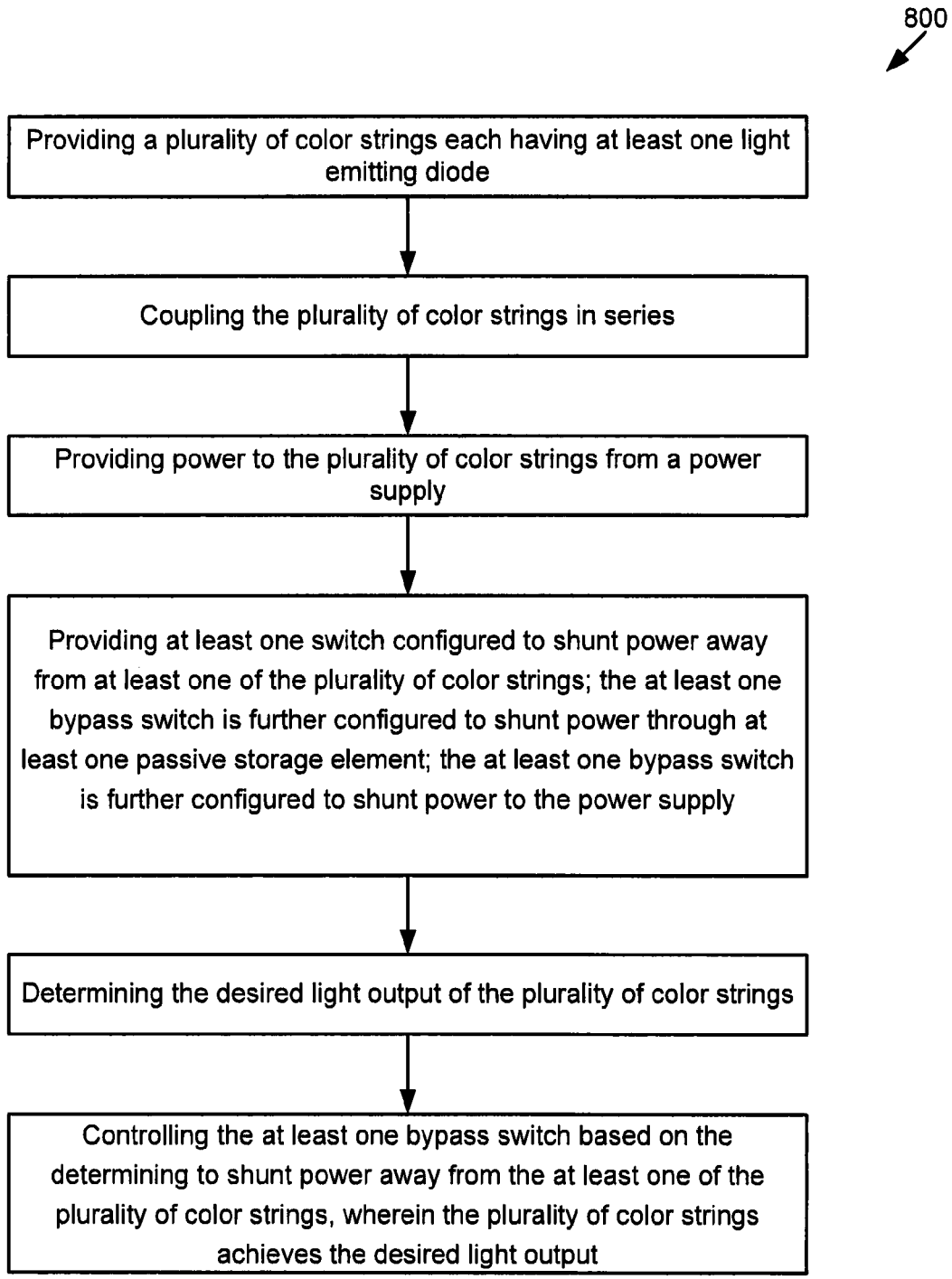
FIG. 8 depicts a flowchart of a method for driving LEDs in dissimilar color string lengths.

In one embodiment, power supply 332 is a high frequency current regulator configured as a constant current source for color strings 322 through 326. Thus, during operation, power supply 332 provides power to color strings 322 through 326. In one embodiment, controller 302 is a processor configured with software for controlling bypass switches 312 through 316. During operation, controller 302 executes software to provide control signals to bypass switches 312 through 316, which are thus controlled to route power provided by power supply 332 among color strings 322 through 326. The control signals may be modulated at a frequency of about 100 kilohertz, for example, to enable advantageous operation of the passive storage elements of electrical circuit 300. A method of providing and utilizing electrical circuit 300 is depicted in flowchart 800 of FIG. 8.

For example, during operation of electrical circuit 300, controller 302 executes software to provide a control signal to bypass switch 312. In particular, in one embodiment controller 302 modulates a signal on the gate of transistor 350, which controls the amount of power shunted away from LED 362 and LED 364 and into inductor 346 and inductor 348, to be returned back to power supply 332 via diode 342. Thus, power is shunted across a passive storage element of bypass switch 312 and back to power supply 332. Similarly controlled bypass switch 314 and bypass switch 316 shunt power away from color string 324 and color string 326, respectively, and return that power back to power supply 332. Because power shunted away from each of color strings 322 through 326 is returned to power supply 332, and because bypass switches 312 through 316 have substantially non-dissipating circuit elements (e.g., passive storage elements), electrical circuit 300 advantageously achieves a high efficiency and exhibits low dissipative loss.

As shown in FIG. 3, color strings 322 through 326 each have at least one LED. In various embodiments, the LEDs of each of color strings 322 through 326 may be placed in various physical orientations. Additionally, in some embodiments the LEDs of a plurality of color strings 322 through 326 may share a similar physical orientation. Furthermore, the LEDs of each of color strings 322 through 326 may be configured to emit light in various colors.

As also shown in FIG. 3, the LEDs of all of color strings 322 through 326 are electrically coupled in series. As such, the LEDs of all of color strings 322 through 326 present a high voltage drop that is the sum of their individual voltage drops. Power supply 332, providing power to color strings 322 through 326 as described above, may thus provide a similarly high supply voltage. In doing so, power supply 332 therefore exhibits higher mains-to-supply voltage conversion efficiency.

Figure 4A:
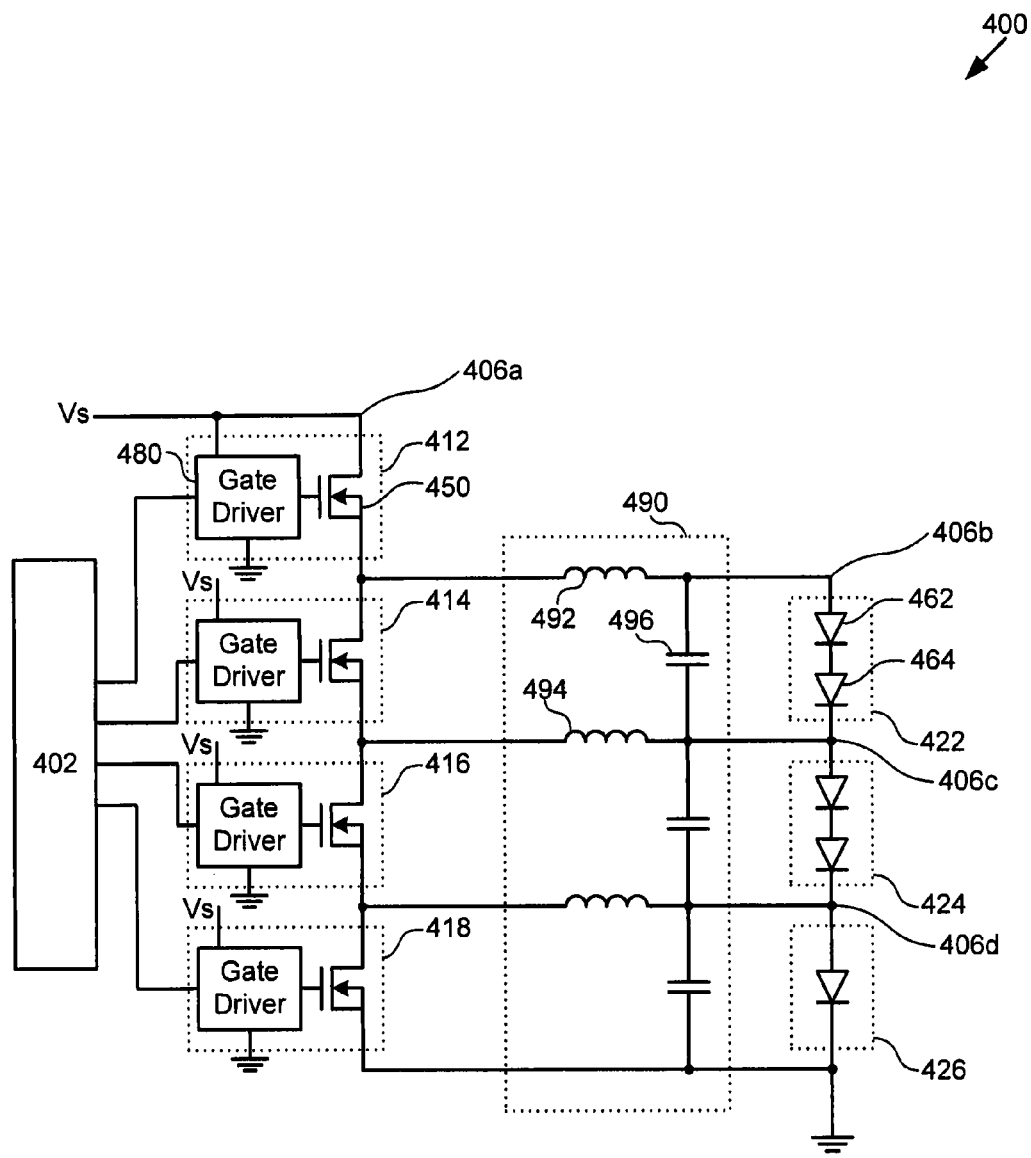
FIG. 4A depicts an electrical circuit for driving LEDs in dissimilar color string lengths.
Figure 4B:
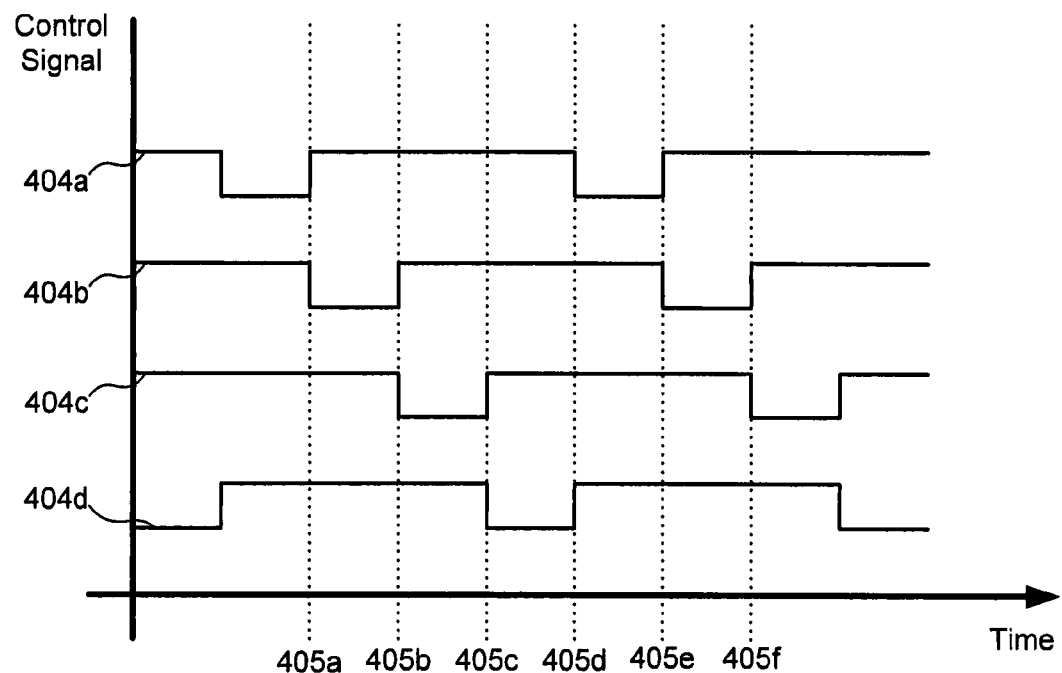
FIG. 4B depicts control signals for driving LEDs in dissimilar color string lengths according to one embodiment of the invention.
Figure 4C:
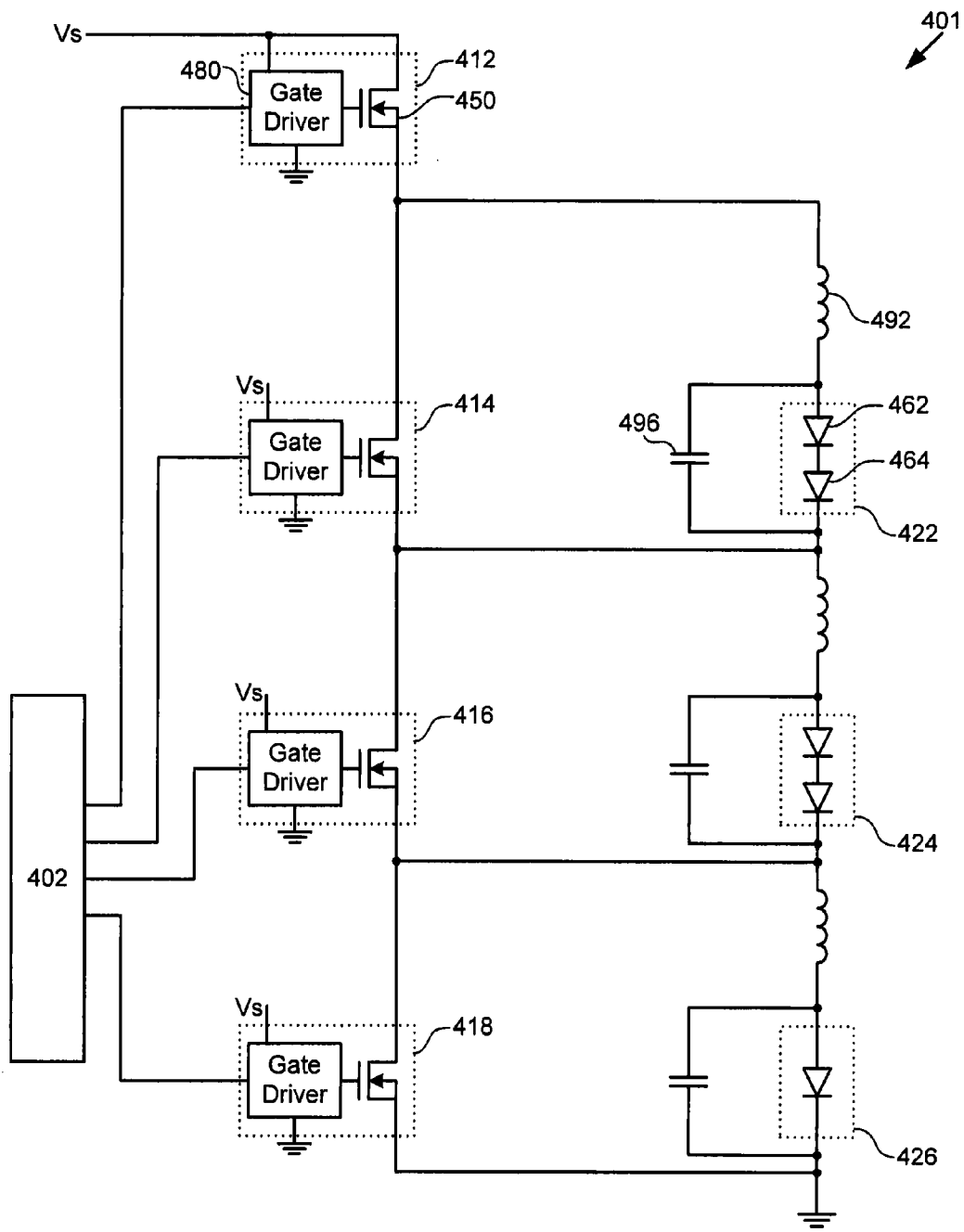
FIG. 4C depicts an electrical circuit for driving LEDs in dissimilar color string lengths.

FIG. 4A depicts electrical circuit 400 for driving LEDs in dissimilar color string lengths according to one embodiment of the invention. FIG. 4B depicts control signal 404a, control signal 404b, control signal 404c, and control signal 404d (collectively "control signals 404a through 404d") for utilization with electrical circuit 400. FIG. 4B will be discussed further below after a discussion of FIG. 4A. Subsequently, FIG. 4C, depicting electrical circuit 401 corresponding in part to electrical circuit 400, will be discussed.

In the example of FIG. 4A, electrical circuit 400 includes color string 422, color string 424, and color string 426 (collectively "color strings 422 through 426"), which are coupled in series in that order. Electrical circuit 400 also includes controller 402 coupled to regulator switch 412, regulator switch 414, regulator switch 416, and regulator switch 418 (collectively "regulator switches 412 through 418"). Electrical circuit 400 additionally includes a power supply (not shown) that provides a supply voltage at node 406a. The power supply may be implemented as a voltage source or a current source. As shown in FIG. 4A, regulator switches 412 through 418 are coupled to color strings 422 through 426 across inductor-capacitor network 490, which is a network of passive storage elements including inductors and capacitors.

In one embodiment, electrical circuit 400 including inductor-capacitor network 490 can be regarded, for example, as having stacked buck regulators, or cascaded regulators. Such an embodiment advantageously has a reduced part count in comparison to an electrical circuit having separate regulators (e.g., non-stacked buck regulators, or non-cascaded regulators). For example, electrical circuit 400 has the four regulator switches 412 through 418, but an electrical circuit having separate regulators may have six or more regulator switches (e.g., two or more regulator switches per color string). An additional advantage of inductor-capacitor network 490 is that by including such a network of passive storage elements, current in color string 422, for example, can be kept substantially continuous with very little ripple. Further, the current in color string 422, for example, being substantially continuous, may be lower for a given apparent brightness of color string 422 than the current in a circuit omitting such passive storage elements. In a particular example, a circuit omitting such passive storage elements that applies power at a 50% duty cycle to a color string will exhibit a given peak current in the color string, but if electrical circuit 400 applies power at a 50% duty cycle to color string 422, color string 422 will advantageously exhibit a continuous current of half, or less than half, of the given peak current, thereby enabling higher LED efficiency.

Although FIG. 4A depicts three color strings in color strings 422 through 426, other embodiments of the invention may have fewer or more color strings. Similarly, although FIG. 4A depicts four regulator switches in regulator switches 412 through 418, other embodiments may have fewer or more regulator switches. Also, although FIG. 4A depicts three inductors and three capacitors in inductor-capacitor network 490, other embodiments may have fewer or more inductors and capacitors, may have components in addition to inductors and capacitors, or may have only inductors or only capacitors. A portion of electrical circuit 400 including, for example, regulator switches 412 through 418 comprises a driver for driving a plurality of color strings each having at least one light emitting diode, where the driver may be implemented, for example, as an integrated circuit or a chip. Some embodiments of such a driver may include portions of inductor-capacitor network 490 such as, for example, inductors or capacitors. Such a driver may also include, in one embodiment, either or both of controller 402 and a power supply.

FIG. 4A shows exemplary detail of regulator switches 412 through 418. For example, regulator switch 412 is shown as having transistor 450 and gate driver 480. Regulator switch 414, regulator switch 416, and regulator switch 418 are shown to have circuit elements corresponding to transistor 450 and gate driver 480. FIG. 4A also shows exemplary detail of color strings 422 through 426. For example, color string 422 is shown as having LED 462 and LED 464. Color string 424 and color string 426 are also shown to have one or more LEDs. FIG. 4A additionally shows exemplary detail of inductor-capacitor network 490. For example, the transistor of regulator switch 414, coupled in parallel with color string 422, is also coupled in parallel with capacitor 496 across inductor 492 and inductor 494.

In one embodiment, controller 402 is a processor configured with software for controlling regulator switches 412 through 418. During operation, controller 402 executes software to provide control signals to regulator switches 412 through 418, which are thus controlled to route power provided by the power supply among color strings 422 through 426. For example, during operation of electrical circuit 400, controller 402 executes software to provide a control signal to regulator switch 412. In particular, in one embodiment controller 402 modulates a signal on gate driver 480, which in turn applies a signal to transistor 450. The control signals may be modulated at a frequency of about 100 kilohertz, for example, to enable advantageous operation of the passive storage elements of electrical circuit 400. Gate driver 480, coupled to the power supply as shown in FIG. 4A, is configured to transform the control signal from controller 402 into a signal suitable for application to transistor 450. Thus controlled, transistor 450 controls the application of power from the power supply via node 406a to color strings 422 through 426.

Additionally, during operation of electrical circuit 400 controller 402 also provides a control signal to regulator switch 414, regulator switch 416, and regulator switch 418. Regulator switch 414, for example, receiving a control signal in a manner corresponding to regulator switch 412, controls an amount of power shunted around LED 462 and LED 464 via inductor 492 and inductor 494. Thus, in one embodiment power is shunted to a set of color strings 422 through 426 excluding color string 422. Similarly controlled regulator switch 416 and regulator switch 418 are configured to shunt power around color string 424 and color string 426, respectively. Because power shunted around each color string of electrical circuit 400 is directed to following color strings (in one embodiment, a set of all of the color strings) or to ground, and because regulator switches 412 through 418 and inductor-capacitor network 490 have substantially non-dissipating circuit elements, electrical circuit 400 advantageously achieves a high efficiency.

As shown in FIG. 4A, color strings 422 through 426 each have at least one LED. In various embodiments, the LEDs of each of color strings 422 through 426 may be placed in various physical orientations. Additionally, in some embodiments the LEDs of a plurality of color strings 422 through 426 may share a similar physical orientation. Furthermore, the LEDs of each of color strings 422 through 426 may be configured to emit light in various colors.

As also shown in FIG. 4A, the LEDs of all of color strings 422 through 426 are electrically coupled in series. As such, the LEDs of all of color strings 422 through 426 present a high voltage drop that is the sum of their individual voltage drops. Power supply 432, providing power to color strings 422 through 426 as described above, may thus provide a similarly high supply voltage. In doing so, power supply 432 therefore exhibits higher mains-to-supply voltage conversion efficiency.

FIG. 4B depicts control signal 404a, control signal 404b, control signal 404c, and control signal 404d (collectively "control signals 404a through 404d") for driving LEDs in dissimilar color string lengths according to one embodiment of the invention. Control signals 404a through 404d can be utilized by electrical circuit 400 of FIG. 4A. Each of control signals 404a through 404d is a pulse-width modulated signal having, in the embodiment shown in FIG. 4B, a 75% duty cycle. A full duty cycle period is depicted between time 405a and time 405e, while 25% of a duty cycle period is between time 405a and time 405b, between time 405b and time 405c, between time 405c and time 405d, and between time 405d and time 405e. Each of control signals 404a through 404d cycles in a staggered manner, such that none of control signals 404a through 404d are deactivated during the same 25% duty cycle period. Thus, for example, when control signal 404a activates at time 405a, control signal 404b deactivates. Later, at time 405b after control signal 404b has been deactivated for 25% of a duty cycle, control signal 404b activates and control signal 404c deactivates. Although FIG. 4B depicts activated control signals 404a through 404d in a logical high condition, or at a voltage level higher than that of deactivated control signals 404a through 404d, some embodiments of the invention may utilize, for example, active-low techniques such that control signals 404a through 404d are activated in a logical low condition, or at a voltage level lower than that of deactivated control signals 404a through 404d.

As stated above, control signals 404a through 404d are utilized by electrical circuit 400 of FIG. 4A. In particular, control signals 404a through 404d are provided by controller 402 to regulator switches 412 through 418, respectively. For example, regulator switch 412, controlled by control signal 404a, applies power from the power supply to color strings 422 through 426 for 75% of the full duty cycle period between time 405a and time 405e. Similarly, regulator switch 414, for example, is controlled by control signal 404b. Thus controlled, regulator switch 414 shunts power around LED 462 and LED 464 via inductor 492 and inductor 494 for 75% of the full duty cycle period between time 405b and time 405f. Notably, because each of control signals 404a through 404d cycles in a staggered manner, control signal 404a and control signal 404b are simultaneously active for a period from time 405b to time 405d, that is, for 50% of a duty cycle period. Similarly, FIG. 4B shows that control signal 404a, control signal 404b, and control signal 404c are simultaneously active for a period from time 405c to time 405d, that is, for 25% of a duty cycle period.

As stated in the above discussion of FIG. 4A, a supply voltage is provided at node 406a. Thus, as applied to electrical circuit 400, control signals 404a through 404d yield 75% of the supply voltage at node 406b, 50% of the supply voltage at node 406c, and 25% of the supply voltage at node 406d. By varying the duty cycles of control signals 404a through 404d, while preserving the staggering of control signals 404a through 404d, the supply voltage can be reapportioned between node 406b, node 406c, and node 406d, thereby controlling the amount of power routed to color strings 422 through 426.

Figure 9:
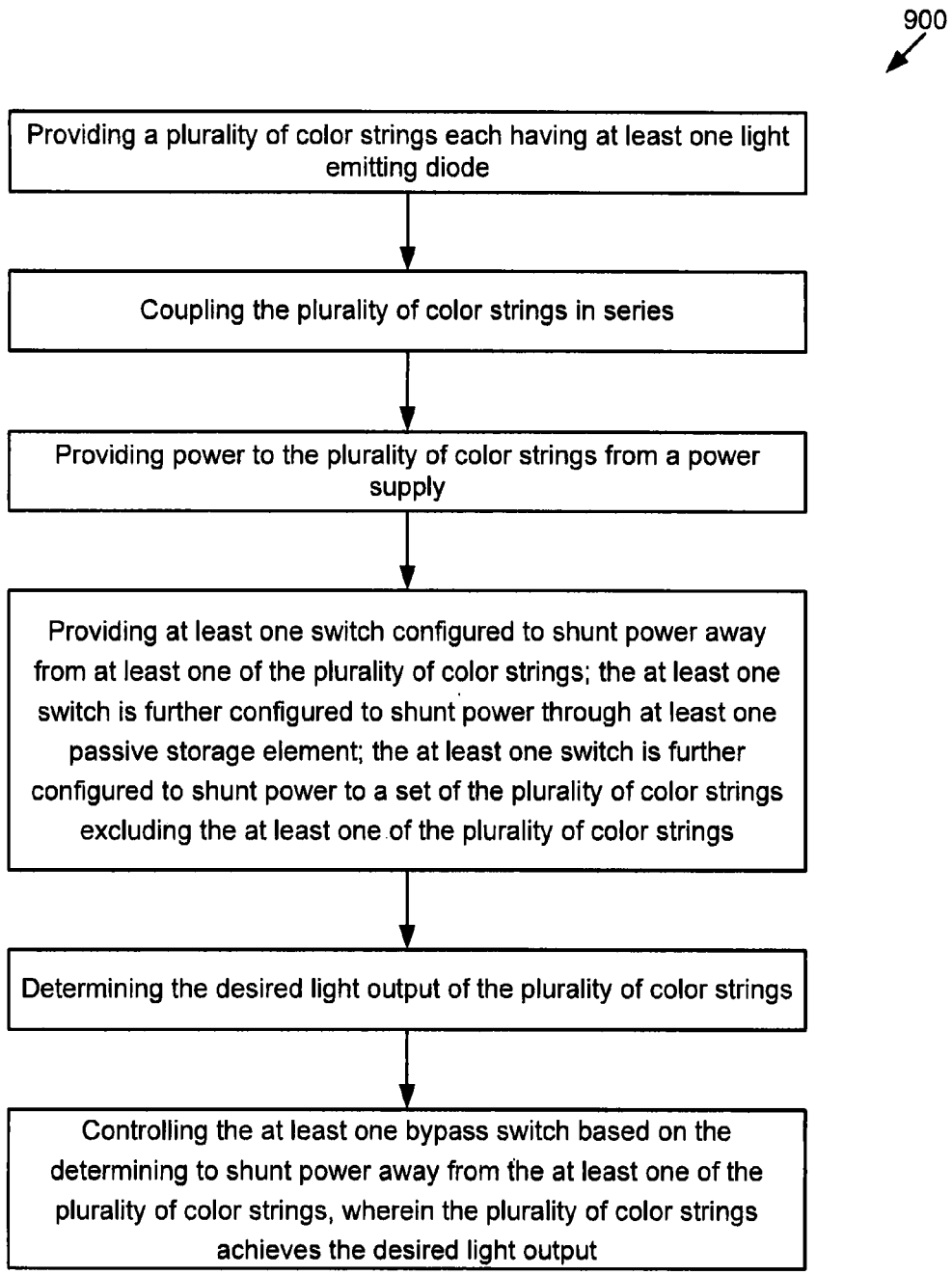
FIG. 9 depicts a flowchart of a method for driving LEDs in dissimilar color string lengths.

Together, FIG. 4A and FIG. 4B illustrate a method for producing a desired light output from color strings 422 through 426. The method includes providing color strings 422 through 426, which each have at least one light emitting diode. The method also includes coupling color strings 422 through 426 in series, in the manner depicted by electrical circuit 400. The method further includes providing power to color strings 422 through 426 from a power supply. Next, the method includes providing at least one regulator switch (e.g., regulator switch 414) configured to shunt power away from at least one of color strings 422 through 426. Subsequently, the method includes determining the desired light output of color strings 422 through 426 (e.g., determining control signals 404a through 404d depicted in FIG. 4B). Following this, the method includes controlling the at least one regulator switch based on the above determination to shunt power away from the at least one of color strings 422 through 426, which is accomplished by applying control signals 404a through 404d to electrical circuit 400. Thus, the method achieves the desired light output from color strings 422 through 426. The method described is also depicted in flowchart 900 of FIG. 9.

In the example of FIG. 4C, electrical circuit 401 includes color strings 422 through 426, controller 402 coupled to regulator switches 412 through 418, and a power supply (not shown), which together substantially correspond to elements depicted in electrical circuit 400. Electrical circuit 401 exhibits many of the novel advantages of, for example, electrical circuit 400. Additionally, electrical circuit 401 exhibits, for example, no interaction. As shown in FIG. 4C, regulator switches 412 through 418 are coupled to color strings 422 through 426 across passive storage elements including inductors and capacitors. In one embodiment, electrical circuit 401 including the passive storage elements can be regarded, for example, as having stacked buck regulators, or cascaded regulators, in a manner similar to electrical circuit 400 of FIG. 4A. Although FIG. 4C depicts three inductors and three capacitors in electrical circuit 401, other embodiments may have fewer or more inductors and capacitors, may have components in addition to inductors and capacitors, or may have only inductors. A portion of electrical circuit 401 including, for example, regulator switches 412 through 418 comprises a driver for driving a plurality of color strings each having at least one light emitting diode, where the driver may be implemented, for example, as an integrated circuit or a chip. Some embodiments of such a driver may include passive storage elements shown in FIG. 4C such as, for example, inductors or capacitors. Such a driver may also include, in one embodiment, either or both of controller 402 and a power supply.

Figure 5:
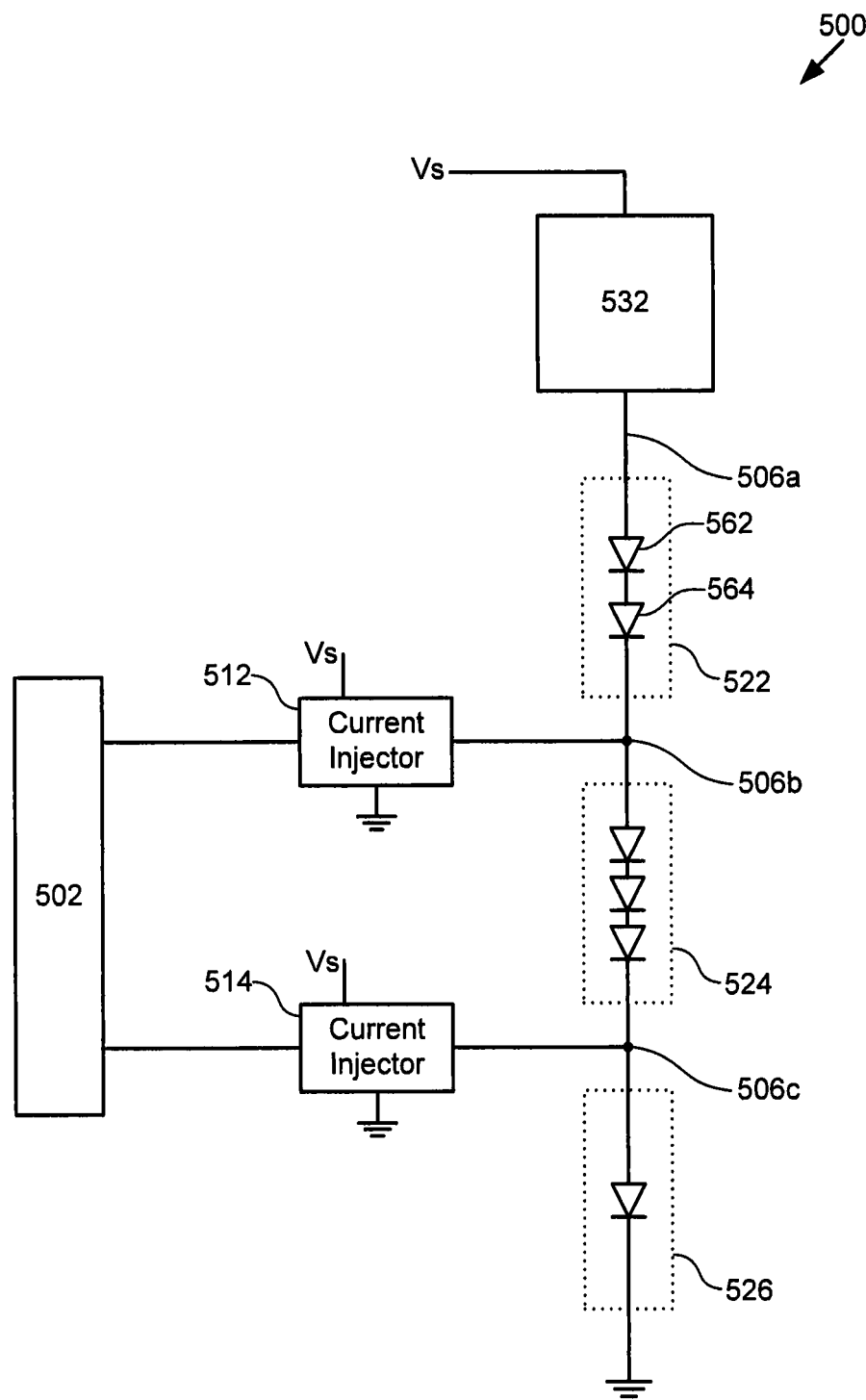
FIG. 5 depicts an electrical circuit for driving LEDs in dissimilar color string lengths.

FIG. 5 depicts electrical circuit 500 for driving LEDs in dissimilar color string lengths according to one embodiment of the invention. In the example of FIG. 5, electrical circuit 500 includes color string 522, color string 524, and color string 526 (collectively "color strings 522 through 526"), which are coupled in series in that order. Thus, color string 522, a first color string, is coupled in series with color string 524, a second color string, through node 506b. Additionally, color string 524, as a first color string, is coupled in series with color string 526, a second color string, through node 506c. Node 506a is shown adjacent to color string 522. Node 506b is shown adjacent to both color string 522 and color string 524. Similarly, node 506c is shown adjacent to both color string 524 and color string 526. Electrical circuit 500 also includes controller 502 coupled to push-pull current injector 512 and push-pull current injector 514 (collectively "push-pull current injectors 512 and 514"). Electrical circuit 500 additionally includes power supply 532 that provides current, via node 506a, that flows through color strings 522 through 526. As shown in FIG. 5, push-pull current injectors 512 and 514 are coupled to node 506b and node 506c, respectively. Although FIG. 5 depicts three color strings in color strings 522 through 526, other embodiments of the invention may have fewer or more color strings. Similarly, although FIG. 5 depicts two push-pull current injectors in push-pull current injectors 512 and 514, other embodiments may have fewer or more push-pull current injectors. A portion of electrical circuit 500 including, for example, push-pull current injectors 512 and 514 comprises a driver for driving a plurality of color strings each having at least one light emitting diode, where the driver may be implemented, for example, as an integrated circuit or a chip. Such a driver may also include, in one embodiment, either or both of controller 502 and power supply 532.

FIG. 5 shows exemplary detail of color strings 522 through 526. For example, color string 522 is shown as having LED 562 and LED 564. Color string 524 and color string 526 are also shown to have one or more LEDs.

Push-pull current injectors 512 and 514 are, in one embodiment, controllable current sources configured to inject or remove current. In one embodiment, controller 502 is a processor configured with software for controlling push-pull current injectors 512 and 514. During operation, controller 502 executes software to provide control signals to push-pull current injectors 512 and 514, which thus inject or remove current from node 506b and node 506c, respectively. For example, during operation of electrical circuit 500, controller 502 executes software to provide a control signal to push-pull current injector 512. Thus controlled, push-pull current injector 512 injects or removes current from node 506b. Because node 506b additionally receives current from power supply 532 via color string 522, the current thus flowing through color string 524 is the sum of the current received via color string 522 and injected or removed by push-pull current injector 512. In another example, during operation controller 502 executes software to provide a control signal to push-pull current injector 514. Thus controlled, push-pull current injector 514 injects or removes current from node 506c. Because node 506c additionally receives current from node 506b via color string 524, the current thus flowing through color string 526 is the sum of the current received via color string 524 and injected or removed by push-pull current injector 514.

Push-pull current injectors 512 and 514 do not operate independently in all cases. For example, the operation of both push-pull current injectors 512 and 514 can affect the amount of current flowing through color string 526. Specifically, altering the amount of current injected or removed by push-pull current injector 514 affects the current flowing through only color string 526, but altering the amount of current injected or removed by push-pull current injector 512 affects the current flowing through both color string 524 and color string 526. However, certain particular operations of push-pull current injectors 512 and 514 can restore, or emulate, independence. Such an operations can comprise a method for independently driving a target color string selected from color strings 522 through 526. For example, push-pull current injectors 512 and 514 can be controlled to increase the amount of current flowing through color string 524, a target color string, without increasing the amount of current flowing through color string 522 and color string 526. This can be accomplished, for example, by injecting a given amount of current by push-pull current injector 512 at node 506b, and removing the same amount of current by push-pull current injector 514 at node 506c. Generalizing from this example, particular operations of push-pull current injectors 512 and 514 can be utilized to independently control any of color strings 522 through 526. Such generalization can be achieved, for example, by the use of circuit analysis and a decoupling matrix.

Figure 10:
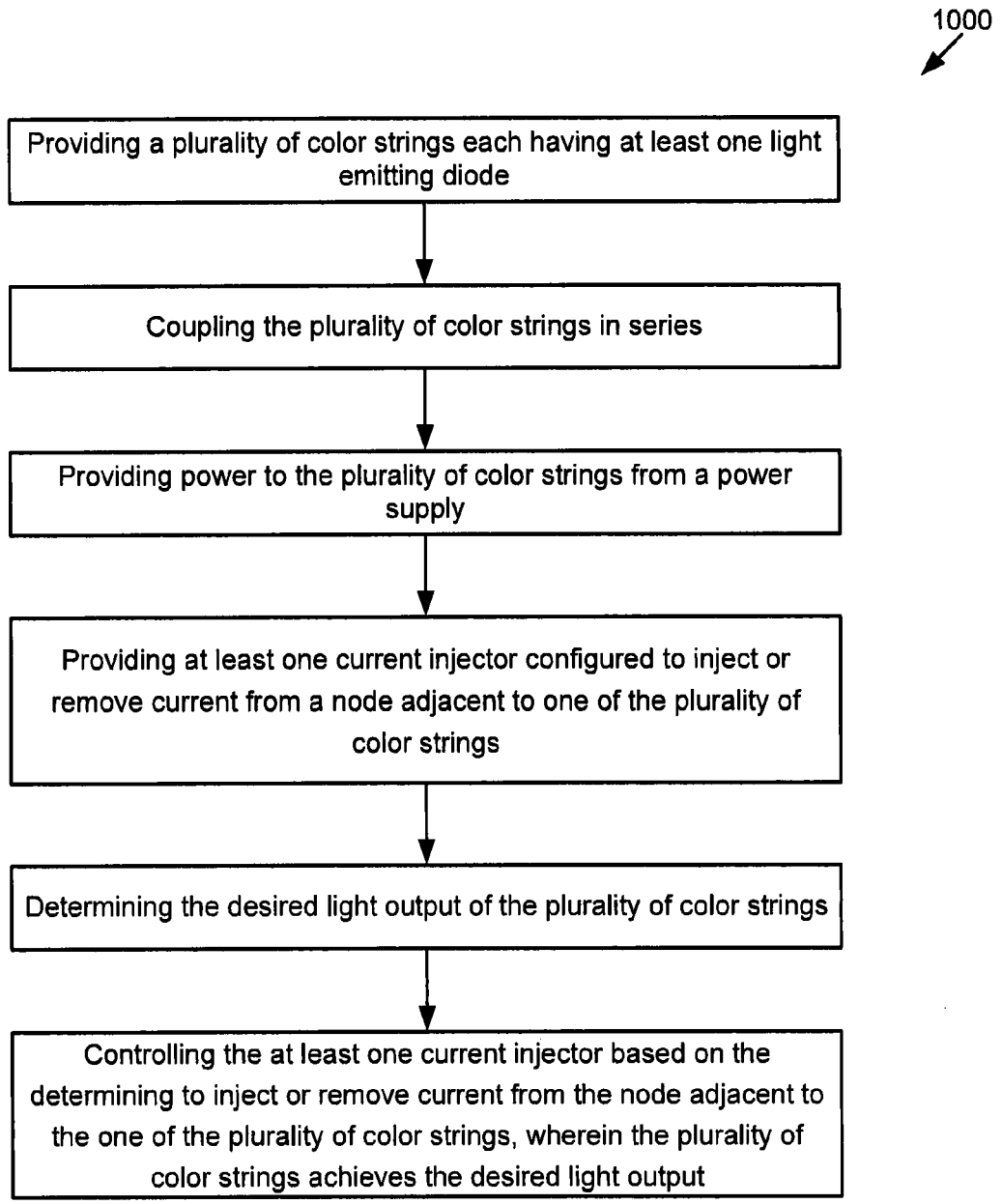
FIG. 10 depicts a flowchart of a method for driving LEDs in dissimilar color string lengths.

FIG. 5 can be utilized to illustrate a method for producing a desired light output from color strings 522 through 526. The method includes providing color strings 522 through 526, which each have at least one light emitting diode. The method also includes coupling color strings 522 through 526 in series, in the manner depicted by electrical circuit 500. The method further includes providing power to color strings 522 through 526 from power supply 532. Next, the method includes providing at least one push-pull current injector, such as push-pull current injector 514, configured to inject or remove current from node 506c adjacent to color string 526. Subsequently, the method includes determining the desired light output of color strings 522 through 526 (e.g., determining control signals for push-pull current injectors 512 and 514 for increasing the brightness of color string 526 relative to color string 522 and color string 524). Following this, the method includes controlling the at least one push-pull current injector based on the above determination to, for example, inject current to node 506c, which is accomplished by applying the determined control signals within electrical circuit 500. Thus, the method achieves the desired light output from color strings 522 through 526. The method described is also depicted in flowchart 1000 of FIG. 10.

As shown in FIG. 5, color strings 522 through 526 each have at least one LED. In various embodiments, the LEDs of each of color strings 522 through 526 may be placed in various physical orientations. Additionally, in some embodiments the LEDs of a plurality of color strings 522 through 526 may share a similar physical orientation. Furthermore, the LEDs of each of color strings 522 through 526 may be configured to emit light in various colors.

As also shown in FIG. 5, the LEDs of all of color strings 522 through 526 are electrically coupled in series. As such, the LEDs of all of color strings 522 through 526 present a high voltage drop that is the sum of their individual voltage drops. Power supply 532, providing power to color strings 522 through 526 as described above, may thus provide a similarly high supply voltage. In doing so, power supply 532 therefore exhibits higher mains-to-supply voltage conversion efficiency.

Figure 6A:
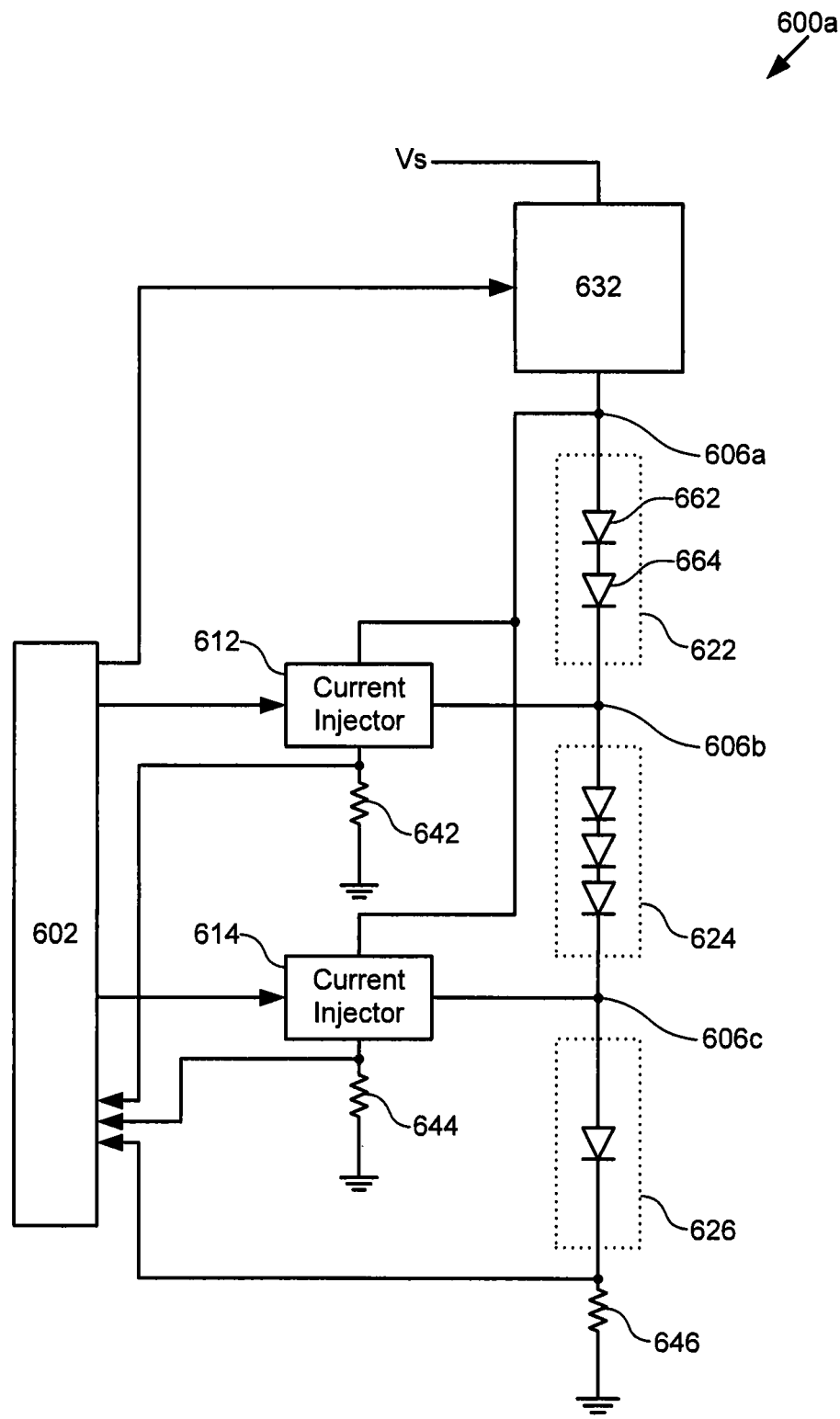
FIG. 6A depicts an electrical circuit for driving LEDs in dissimilar color string lengths.
Figure 6B:
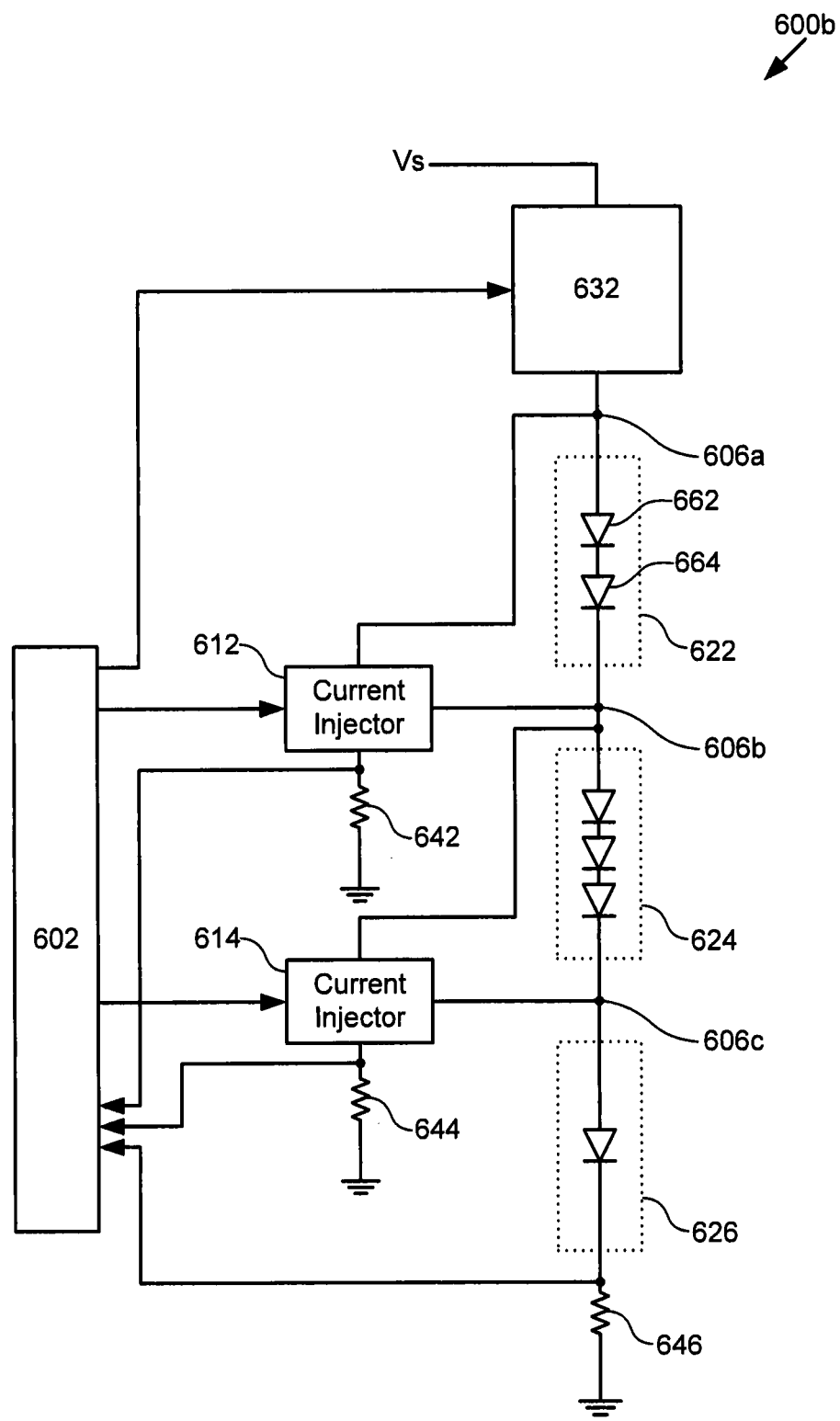
FIG. 6B depicts an electrical circuit for driving LEDs in dissimilar color string lengths.
Figure 6C:
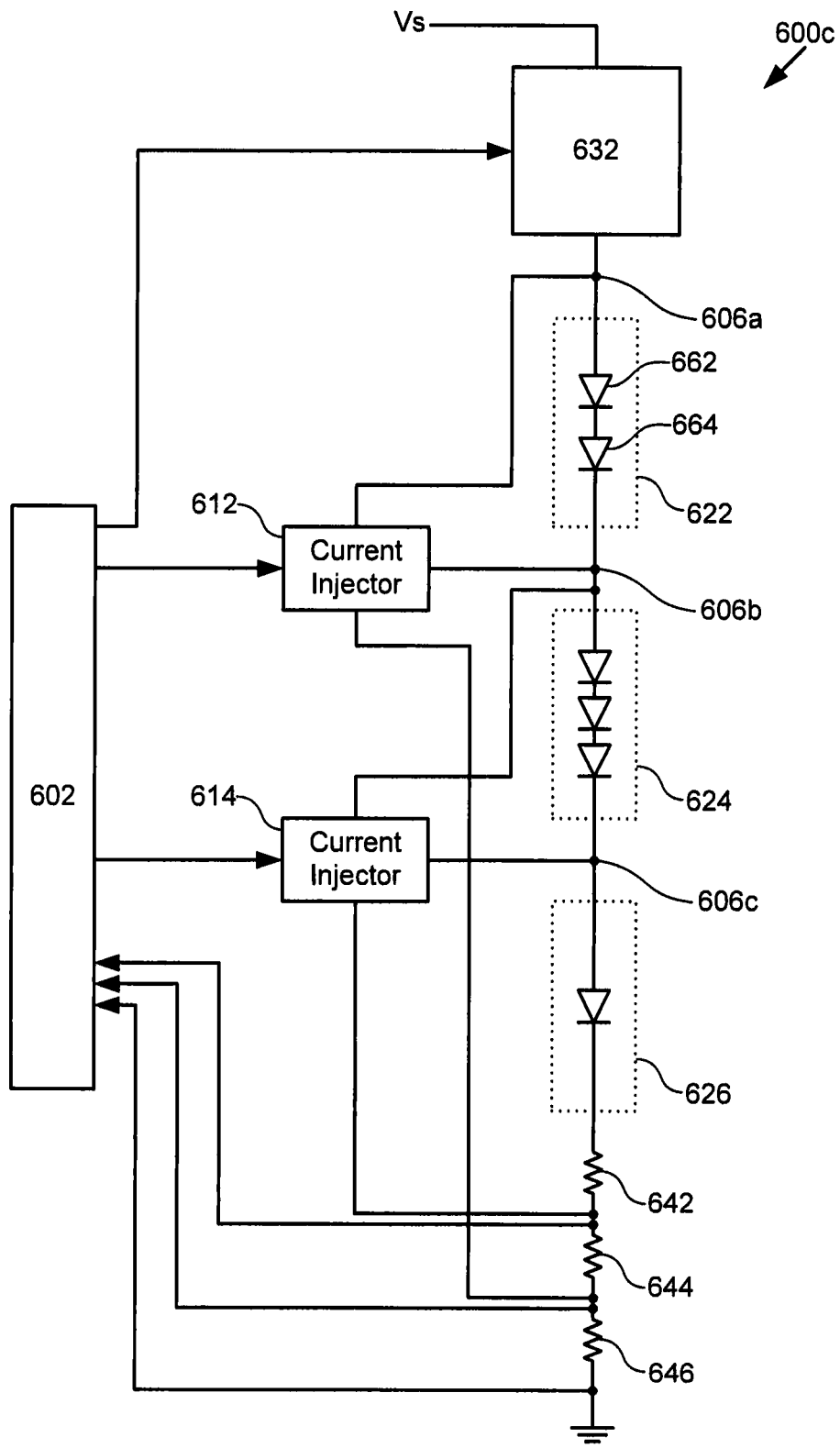
FIG. 6C depicts an electrical circuit for driving LEDs in dissimilar color string lengths.

FIG. 6A, FIG. 6B, and FIG. 6C depict respective electrical circuit 600a, electrical circuit 600b, and electrical circuit 600c (collectively "electrical circuits 600a through 600c") for driving LEDs in dissimilar color string lengths according to three embodiments of the invention. Electrical circuits 600a through 600c are discussed together below.

In the examples of FIG. 6A, FIG. 6B, and FIG. 6C, electrical circuits 600a through 600c include color string 622, color string 624, and color string 626 (collectively "color strings 622 through 626"), which are coupled in series in that order. Thus, color string 622, a first color string, is coupled in series with color string 624, a second color string, through node 606b. Additionally, color string 624, as a first color string, is coupled in series with color string 626, a second color string, through node 606c. Node 606a is shown adjacent to color string 622. Node 606b is shown adjacent to both color string 622 and color string 624. Similarly, node 606c is shown adjacent to both color string 624 and color string 626. Electrical circuits 600a through 600c also include controller 602 coupled to push-pull current injector 612 and push-pull current injector 614 (collectively "push-pull current injectors 612 and 614"). Electrical circuits 600a through 600c additionally include power supply 632 that provides current, via node 606a, that flows through color strings 622 through 626. As shown in FIG. 6A, FIG. 6B, and FIG. 6C, push-pull current injectors 612 and 614 are coupled to node 606b and node 606c, respectively. Although FIG. 6A, FIG. 6B, and FIG. 6C depict three color strings in color strings 622 through 626, other embodiments of the invention may have fewer or more color strings. Similarly, although FIG. 6A, FIG. 6B, and FIG. 6C depict two push-pull current injectors in push-pull current injectors 612 and 614, other embodiments may have fewer or more push-pull current injectors. A portion of electrical circuits 600a through 600c including, for example, push-pull current injectors 612 and 614 comprises a driver for driving a plurality of color strings each having at least one light emitting diode, where the driver may be implemented, for example, as an integrated circuit or a chip. Such a driver may include, in one embodiment, one or more of current sense resistor 642, current sense resistor 644, and current sense resistor 646. Such a driver may also include, in one embodiment, either or both of controller 602 and power supply 632.

FIG. 6A, FIG. 6B, and FIG. 6C show exemplary detail of color strings 622 through 626. For example, color string 622 is shown as having LED 662 and LED 664. Color string 624 and color string 626 are also shown to have one or more LEDs. The LEDs of each of color strings 622 through 626 may be configured to emit light in various colors.

In the examples of FIG. 6A, FIG. 6B, and FIG. 6C, push-pull current injectors 612 and 614 are controllable current sources. In one embodiment, controller 602 is a processor configured with software for controlling push-pull current injectors 612 and 614. During operation, controller 602 executes software to provide control signals to push-pull current injectors 612 and 614, which thus inject or remove current from node 606b and node 606c, respectively. Push-pull current injectors 612 and 614 may be configured to restore, or emulate, independent control of color strings 622 through 626 in a manner corresponding to push-pull current injectors 512 and 514 of electrical circuit 500 depicted in FIG. 5.

FIG. 6A, FIG. 6B, and FIG. 6C depict controller 602 configured to receive current information from current sense resistor 642, current sense resistor 644, and current sense resistor 646. Controller 602 can utilize the current information to generate control signals to independently control, for example, the brightness of color strings 622 through 626 to achieve a desired light output. In one embodiment, current sense resistor 642, current sense resistor 644, and current sense resistor 646 are located near a ground voltage level to advantageously perform low-side sensing.

FIG. 6A, FIG. 6B, and FIG. 6C depict several different configurations for providing power to push-pull current injectors 612 and 614. For example, in FIG. 6A, push-pull current injectors 612 and 614 are both connected between node 606a and respective sense resistor 642 and sense resistor 644. Push-pull current injectors 612 and 614 thereby receive power from node 606a. In FIG. 6B, push-pull current injector 612 is connected between node 606a and current sense resistor 642, and push-pull current injector 614 is connected between node 606b and current sense resistor 644. Push-pull current injector 612 thereby receives power from node 606a, and push-pull current injector 614 thereby receives power from node 606b. In FIG. 6C, push-pull current injector 612 is connected between node 606a and sense resistor 646, and push-pull current injector 614 is connected between node 606b and both sense resistor 644 and sense resistor 646. In a manner similar to that depicted in FIG. 6B, push-pull current injector 612 thereby receives power from node 606a, and push-pull current injector 614 thereby receives power from node 606b. Coupling between lower-voltage-potential nodes (e.g., node 606b) has advantages including, but not limited to, reduced switching loss.

Figure 7:
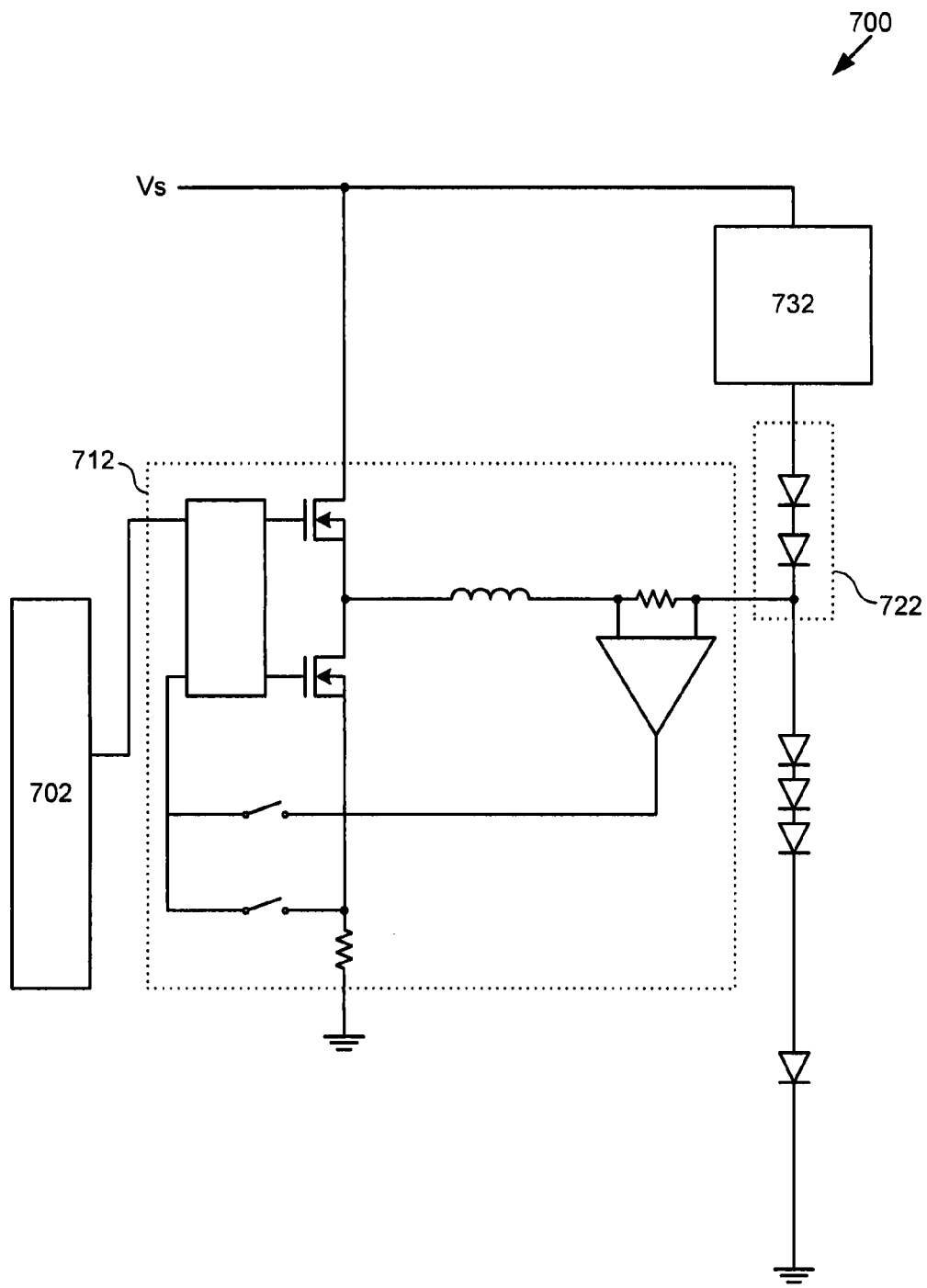
FIG. 7 depicts an electrical circuit for driving LEDs in dissimilar color string lengths.

FIG. 7 depicts electrical circuit 700 for driving LEDs in dissimilar color string lengths according to one embodiment of the invention. In the example of FIG. 7, electrical circuit 700 includes color string 722, which corresponds substantially to color string 622 of electrical circuit 600a shown in FIG. 6A, and controller 702, which corresponds substantially to controller 602. Controller 702 is coupled to push-pull current injector 712. FIG. 7 shows exemplary detail of push-pull current injector 712, which is configured as a controllable bidirectional current source.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word:

any of the items in the list, all of the items in the list, and any combination of the items in the list.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. A light emitting diode driver for driving a plurality of color strings each having at least one light emitting diode, wherein the plurality of color strings are coupled in series, and wherein the plurality of color strings is coupled to a power supply, the driver comprising:
    a plurality of capacitors, wherein at least one capacitor is coupled in parallel to each one of the plurality of color strings;
    a plurality of inductors; and
    a plurality of switches, wherein each of the plurality of switches is coupled to a first one of the plurality of inductors through a first terminal of the switch and coupled to a second one of the plurality of inductors through a second terminal of the switch, wherein each set of one switch and at least two inductors is further coupled in parallel to one of the plurality of color strings, and further wherein the first terminal of each of the plurality of switches is coupled to the power supply through a first diode, and the second terminal of each of the plurality of switches is coupled to ground through a second diode,
    wherein each switch is configured to shunt power away from a corresponding one of the plurality of color strings in parallel with the switch and return at least a portion of the shunted power through the first diode back to the power supply at a node between the power supply and a voltage supply; and
    a controller configured to provide control signals to the plurality of switches to route power among the plurality of color strings to obtain a desired output color from the plurality of color strings.

2. The driver of claim 1, wherein the power supply is a voltage source, and the voltage source is configured to provide voltage across the plurality of color strings.

3. The driver of claim 1, wherein the power supply is a current source, the current source is configured to provide current to the plurality of color strings.

4. The driver of claim 1, wherein the control signals are modulated.

5. The driver of claim 1, wherein the control signals are modulated at approximately 100 kHz.

6. The driver of claim 1, wherein the plurality of color strings includes at least two different color string lengths.

7. The driver of claim 1, wherein at least one of the plurality of color strings contains light emitting diodes of different colors.

8. A light emitting diode driver for driving a plurality of color strings each having at least one light emitting diode, wherein the plurality of color strings are coupled in series, wherein a power supply is configured to provide power to the plurality of color strings, wherein a second terminal of each color string is coupled directly to a first terminal of a next color string in the series, and a second terminal of a last color string in the series is coupled to ground, the driver comprising:
    a plurality of capacitors, wherein each capacitor is coupled in parallel to one of the plurality of color strings, and the plurality of capacitors is coupled in series;
    a plurality of inductors, wherein a first terminal of each inductor is coupled to a first terminal of each color string;
    a plurality of switches coupled in series, wherein a first terminal of each switch is coupled to a second terminal of an inductor, and a second terminal of a last switch in the series of switches is coupled to ground, wherein each switch is configured to shunt power away from a corresponding color string; and
    a controller configured to provide control signals to the plurality of switches to route power among the plurality of color strings to obtain a desired output color from the plurality of color strings.

9. The driver of claim 8, wherein the power supply is a voltage source.

10. The driver of claim 8, wherein the power supply is a current source.

11. The driver of claim 8, wherein the control signals are modulated.

12. The driver of claim 8, wherein the control signals are modulated at approximately 100 kHz.

13. The driver of claim 8, wherein power shunted away from a selected color string is shunted to a next color string in the series of color strings.

14. The driver of claim 8, wherein the plurality of color strings includes at least two different color string lengths.

15. The driver of claim 8, wherein at least one of the plurality of color strings contains light emitting diodes of different colors.

16. A method of producing a desired total light output using light emitting diodes, the method comprising:
    providing a plurality of color strings coupled in series, wherein each color string has at least one light emitting diode, wherein a power supply is configured to provide power to the plurality of color strings, wherein a second terminal of each color string is coupled directly to a first terminal of a next color string in the series, and a second terminal of a last color string in the series is coupled to ground;

providing a plurality of capacitors, wherein each capacitor is coupled in parallel to one of the plurality of color strings, and the plurality of capacitors is coupled in series;

providing a plurality of inductors, wherein a first terminal of each inductor is coupled to a first terminal of each color string;

providing a plurality of switches coupled in series, wherein a first terminal of each switch is coupled to a second terminal of an inductor, and a second terminal of a last switch in the series of switches is coupled to ground, wherein each switch is configured to shunt power away from a corresponding color string;

determining a desired color string light output from each of the plurality of color strings to obtain the desired total light output; and providing control signals to the plurality of switches to route power among the plurality of color strings to obtain the desired color string light output from each of the plurality of color strings.

17. The method of claim 16, wherein the control signals are modulated.

18. The method of claim 16, wherein the control signals are modulated at approximately 100 kHz.

19. The method of claim 16, wherein power shunted away from a selected color string is shunted to the next color string in the series of color strings.

20. The method of claim 16, wherein the plurality of color strings includes at least two different color string lengths.

* * * * *